US007177420B2

(12) United States Patent
Carter

(10) Patent No.: US 7,177,420 B2
(45) Date of Patent: Feb. 13, 2007

(54) CARRIER WITH BUILT-IN AMPLIFICATION FOR PERSONAL AUDIO DEVICE

(76) Inventor: James M. Carter, P.O. Box 3478, Las Cruces, NM (US) 88003

( * ) Notice: Subject to any disclaimer, the term of this patent is extended or adjusted under 35 U.S.C. 154(b) by 997 days.

(21) Appl. No.: 09/898,648

(22) Filed: Jul. 3, 2001

(65) Prior Publication Data

US 2003/0008631 A1  Jan. 9, 2003

(51) Int. Cl.
*H04M 1/00* (2006.01)
(52) U.S. Cl. ............... 379/447; 379/438; 379/446; 379/455; 224/652; 224/153
(58) Field of Classification Search ........... 379/438, 379/447, 446, 455; 224/652, 153
See application file for complete search history.

(56) References Cited

U.S. PATENT DOCUMENTS

| 2,678,779 A | * | 5/1954 | Bellmer ................. 379/438 |
| 4,754,901 A | | 7/1988 | Villanueva et al. |
| 4,933,921 A | * | 6/1990 | Saunders ................. 369/5 |
| 4,981,243 A | | 1/1991 | Rogowski |
| 5,001,779 A | | 3/1991 | Eggert et al. |
| 5,046,104 A | | 9/1991 | Kloss |
| 5,212,734 A | | 5/1993 | Tsao |
| 5,353,975 A | | 10/1994 | Libertucci |
| 5,395,023 A | | 3/1995 | Naymark et al. |
| 5,409,152 A | | 4/1995 | Trevino |
| 5,771,305 A | | 6/1998 | Davis |
| 5,897,042 A | | 4/1999 | Sims |
| 5,898,787 A | | 4/1999 | Stanford |
| D409,378 S | | 5/1999 | Lidsky |
| D426,702 S | | 6/2000 | Yen |
| 6,712,249 B2 | * | 3/2004 | Magnusson et al. ........ 224/652 |

\* cited by examiner

*Primary Examiner*—Jefferey F. Harold
(74) *Attorney, Agent, or Firm*—DeWitt M. Morgan

(57) ABSTRACT

A hand carriable container for a portable personal audio device of the type which is normally listened to with earphones. The container includes: structure for holding the portable personal audio device; a device, separate from the personal audio device, for amplifying sound from said personal audio device; a source of power separate from the personal audio device, for the amplifying mechanism; a pair of speakers; and wiring for electrically connecting the personal audio device, the speakers, and the power supply to the amplifying mechanism. The speakers are mounted in compartments which are detachable and remotely positionable from the main portion of the container. The main portion of the container includes structure for storing prerecorded audio material. The wires to the speaker are supported by a take-up reel supported in the main portion of the container.

4 Claims, 10 Drawing Sheets

CARRIER WITH BUILT-IN AMPLIFICATION FOR PERSONAL AUDIO DEVICE

FIELD OF THE INVENTION

The present invention relates to carriers for holding portable personal audio devices, particularly of the type that utilize head or earphones. More particularly, the present invention relates to carriers which include built-in speakers, an amplifier and a power source.

BACKGROUND OF THE INVENTION

Personal audio devices such as CD players, AM/FM radios, MP-3 players, hard drive audio recording devices are small self contained personal sound entertainment systems which, because they do not include speakers, utilize audio head gear to convey the audio output signal(s) to a single user. These devices are easily carried or transported by an individual, and operate on batteries or transformed power. Bags and containers to protect and transport these personal audio devices ("PADs") and bags and containers for their respective media are popular and convenient. The utility of the devices is limited by the fact that they are single user devices. Currently there are no commercially available systems to convert their single listener use to multi listener use, unless done with stationary electronics already set up in a home or office.

A bag with speakers is illustrated in U.S. Pat. No. Des. 409,378. However, if the user of such a personal audio device attempts to power speaker systems with such a device, the result is unsatisfactory as the audio output signal necessary to drive a set of headphones with good quality is somewhat less than the requirement for a set of speakers. This is also true of the optional speakers illustrated in U.S. Pat. No. 4,981,243.

The use of an audio carrier, adapted for mounting on a bicycle, is disclosed is U.S. Pat. No. 4,754,901. The disclosed carrier includes a strap for holding a personal protable radio, speakers, a battery and amplifier circuit boards.

Carriers which include receivers, amplifiers, a power source and speakers are disclosed in U.S. Pat. Nos. 5,001,779 and 5,771,305. However, these carriers are designed to support, in conjunction with the use on motorcycles, the type of audio components that are typically installed in automobiles and trucks. They are not designed for use with personal audio devices which require earphones.

OBJECTS OF THE INVENTION

It is an object of the present invention to provide a carrier for a personal audio device, which incorporates an amplifier in a central unit and two detachable speaker units which can be placed remotely from the main unit.

It is another object of the present invention to provide a take-up reel mechanism for the convenient rewinding and storage of speaker wire when the speaker units are attached to the central unit.

It is a further object of the present invention to provide a carrier with alternate power supplys.

It is yet another object of the present invention to provide a carrier of the above type which incorporates one or more areas for the storage of recorded media.

It is an object of the present invention to provide a carrier for a personal audio device, of the type which is normally listened to with earphones, which has a handle or other carrying device.

These and other objects will be apparent from the description which follows.

SUMMARY OF THE INVENTION

A hand carriable container for a portable personal audio device of the type which is normally listened to with earphones. The container includes: structure for holding the portable personal audio device; a device, separate from the personal audio device, for amplifying sound from said personal audio device; a source of power separate from the personal audio device, for the amplifying mechanism; at least one speaker; and wiring (or equivalent) for electrically connecting the personal audio device, the speaker, and the power supply to the amplifying mechanism.

Preferably, there are two speakers, each of which is supported in a separate compartment, which compartments are detachable and remotely positionable from the main portion of the container. Preferably, the speakers are connected to the amplifying device by wires, which wires are supported by a take-up reel supported in the main portion of the container. Alternately, the speakers and the amplifying device can be interconnected by a wireless signal transmitting and receiving mechanisms. The power supply, separate from the personal audio device, is either a battery or a transformer. The main portion of the container, which supports the amplifying device and power supply, includes structure for storing pre-recorded audio material (e.g. CDs, cassette tapes, etc.).

The invention also includes a wire take-up mechanism which includes a rotating spool. The spool includes a first section for supporting a portion of a first wire in a coiled fashion, and a second section for supporting a portion of a second wire in a coiled fashion. The spool also includes a hollow portion through which a portion of both wires pass, which hollow section includes a passage for the first wire and a second passage for the second wire. A section of the wires are twisted together prior to being threaded through the first and second passages. Both wires are wrapped in the same direction.

DESCRIPTION OF THE PREFERRED EMBODIMENT

Figure 1:
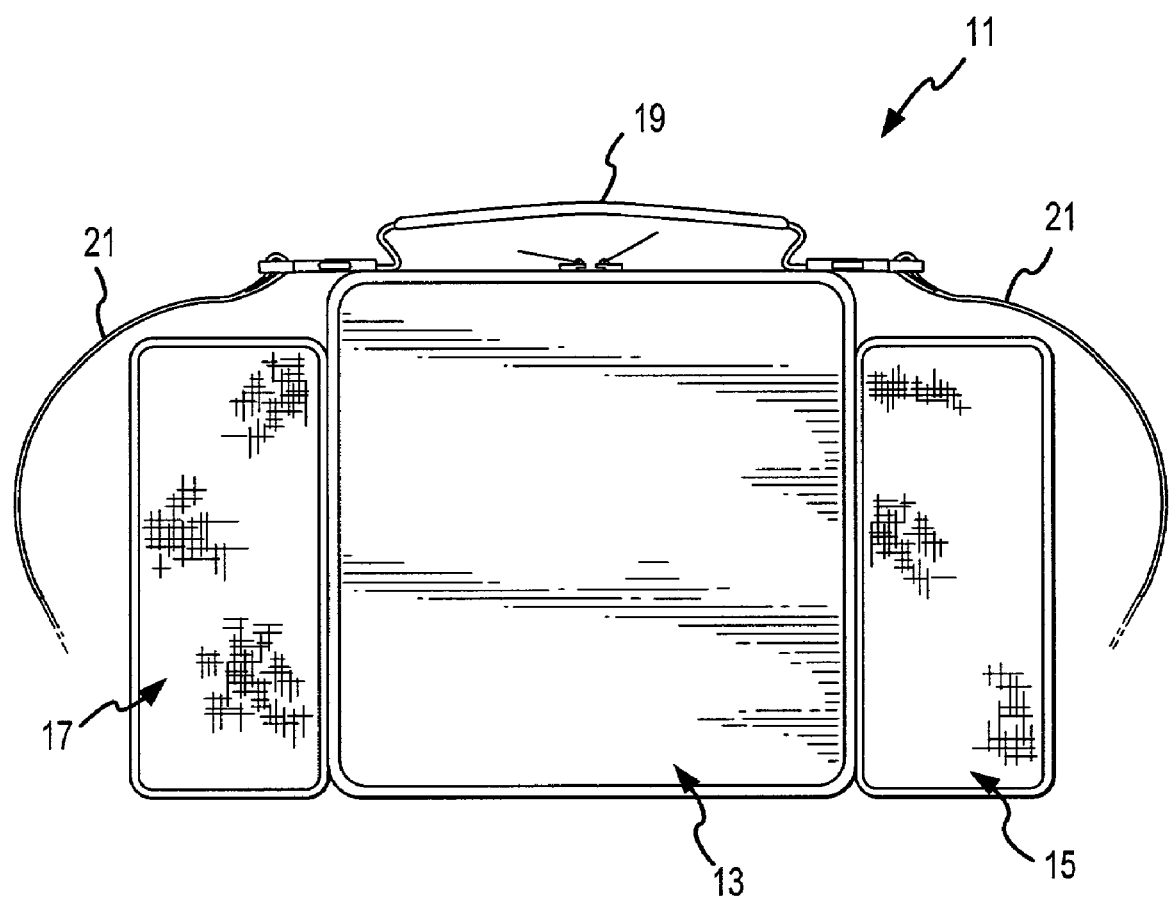
FIG. 1 is the front view of the audio equipment bag of the present invention, with the speaker compartments attached.
Figure 5:
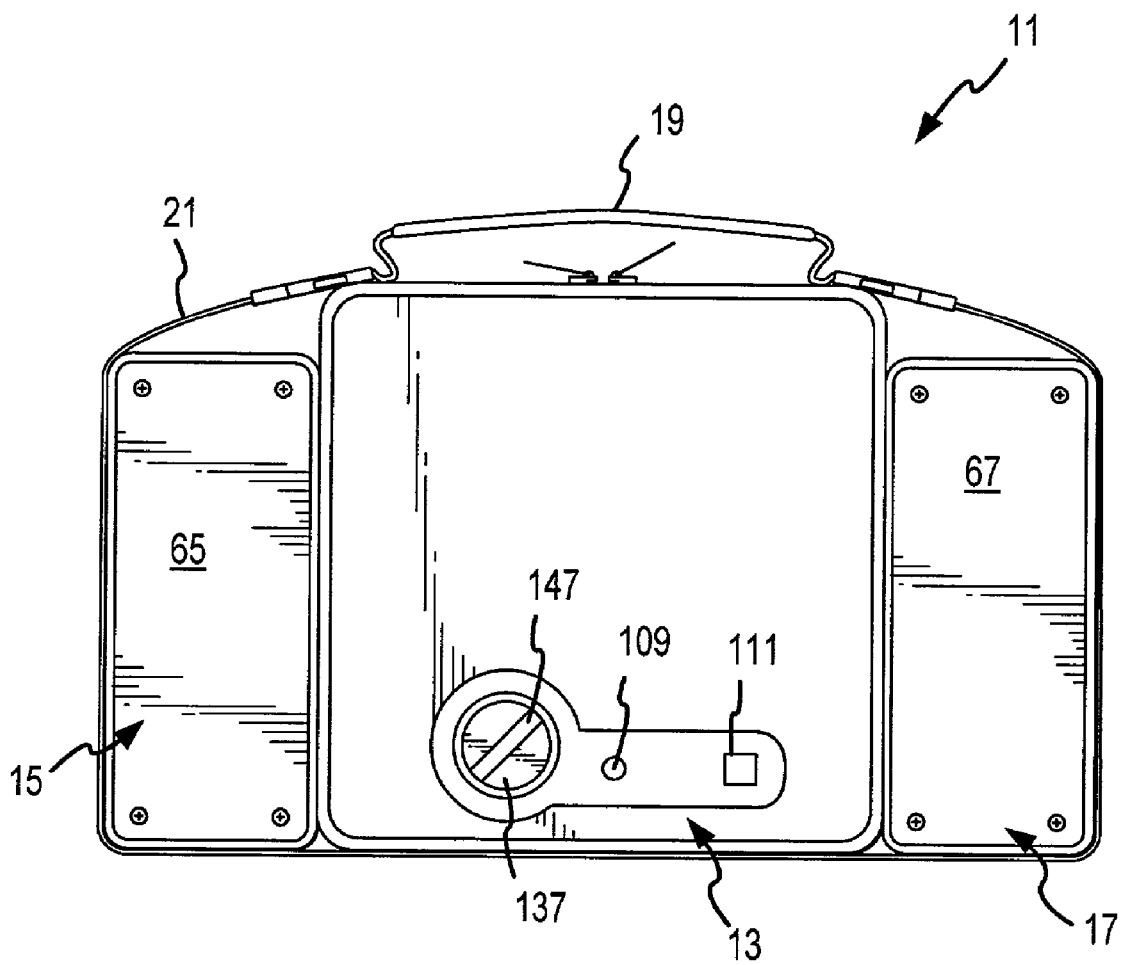
FIG. 5 is the back view of the bag of the present invention, with the speaker compartments attached, showing the exterior of the speaker wire take-up reel.

With reference to FIG. 1, carrier 11 includes a central, zip open compartment 13 and speaker compartments 15 and 17. On the top of compartment 13 are attached both a carrying handle 19 and a strap 21. Strap 21, which can be adjusted in length by a conventional mechanism (not shown) can be used as a shoulder strap. Alternately, as illustrated in FIG. 5, it can be tightly wrapped around compartments 13, 15 and 17 to provide a mechanism/additional mechanism for securing them together for transportation. Preferably, strap 21 is made of a web type fabric and can include any conventional attachment mechanism (e.g. buckles, snaps, hook and lop, etc.) for detaching it from compartment 13. The front 23, back, and sides of compartment 13 are made of a semi-rigid foam (not shown) sandwiched between two layers of fabric. Alternately, compartment could be made of rigid plastic with or without a fabric coating.

Figure 2:
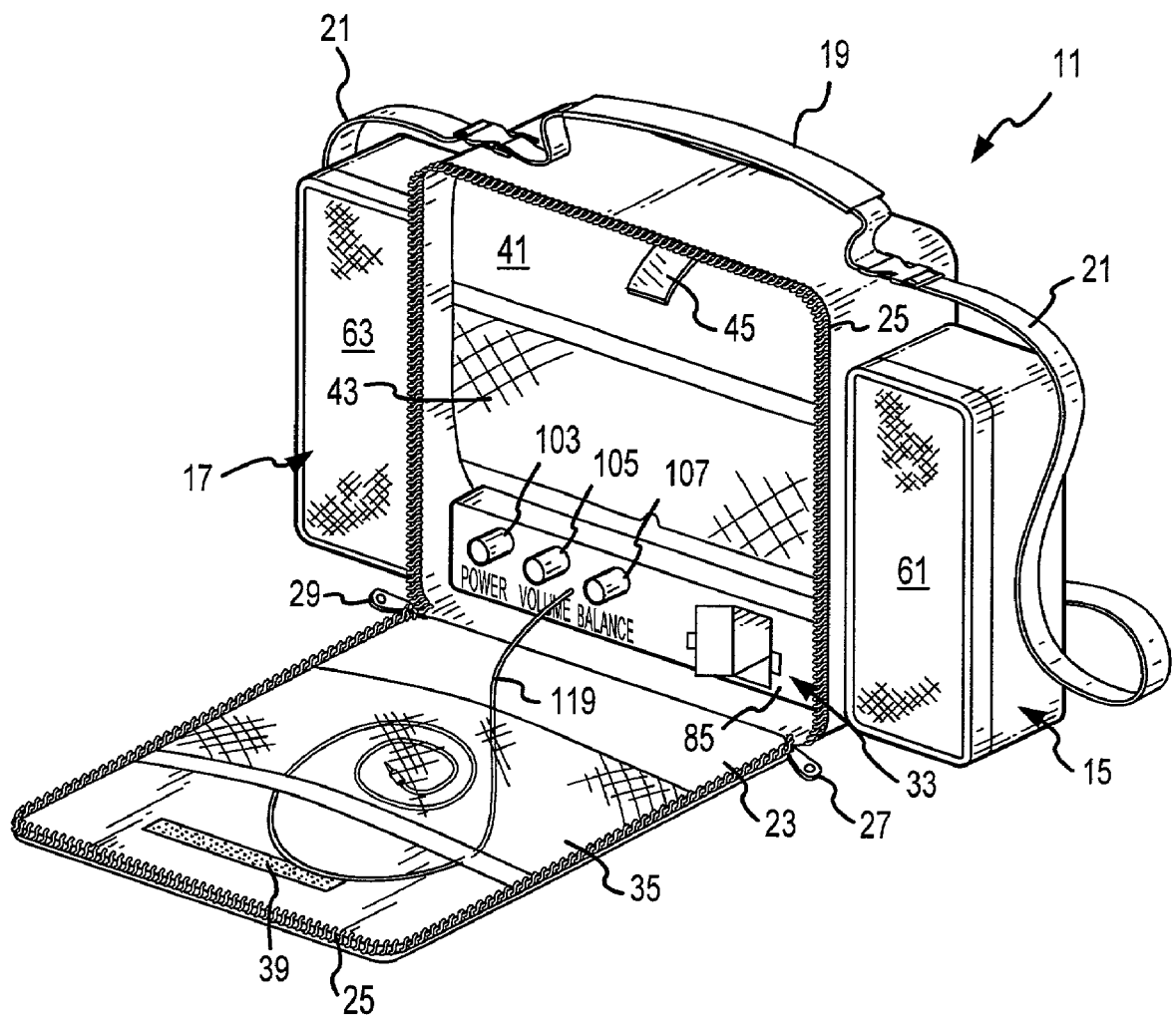
FIG. 2 is a front perspective view of the bag of the present invention with the front compartment opened, showing the amplifier/power supply/speaker wire take-up reel unit, and the CD holder.
Figure 3:
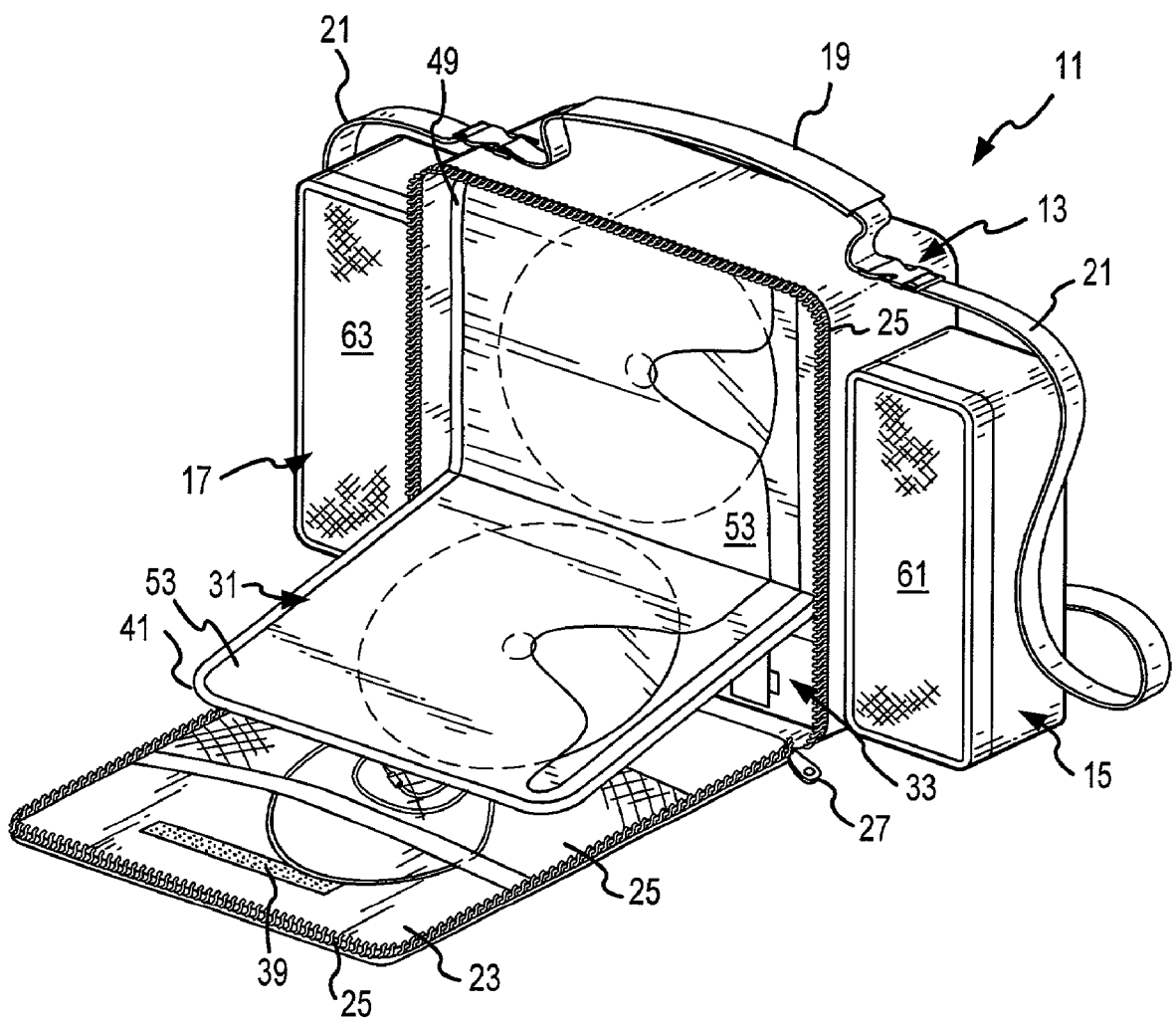
FIG. 3 is a front perspective view of the bag of the present invention with the front compartment opened and the CD holder opened.
Figure 4:
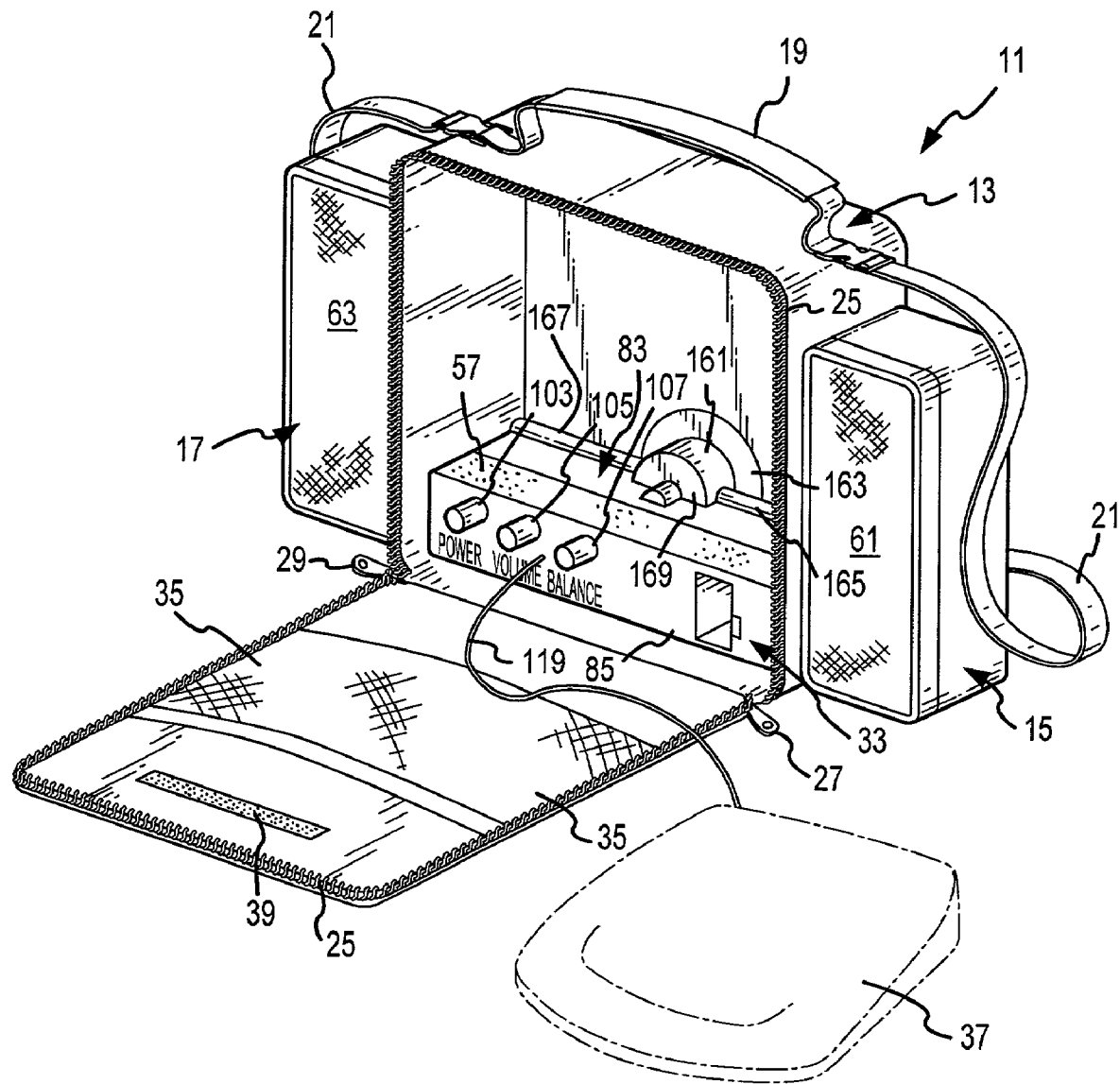
FIG. 4 is a front perspective view of the bag of the present invention, with the CD holder removed to show the amplifier/power supply/speaker wire take-up reel unit.

The front 23 of compartment 13 can be opened and folded down via zipper 25 having openers 27 and 29, as illustrated in, for instance, FIGS. 2, 3 and 4. When so opened, the interior of compartment 13 is opened exposing CD holder 31, and amplifier/power supply/speaker wire rewind (or take-up) reel unit 33. The inside of front 23 includes a pocket 35 for holding a portable CD player 37 (such as illustrated in broken lines in FIG. 4) or other personal audio device of the type which utilizes earphones. The inside of front 23 may also include a Velcro (or equivalent) strip 39 which can also (or alternately) be used to hold CD player 37, if a mating Velcro strip (not shown) is secured to its bottom side.

Figure 3A:
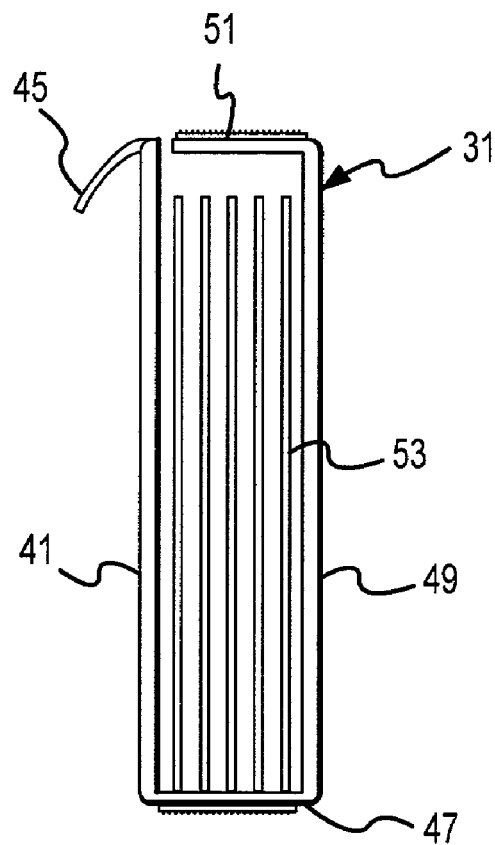
FIG. 3A is a side view of a CD holder which can be incorporated into the present invention.

As best illustrated in FIGS. 2, 3 and 3A, CD holder 31 includes a front cover 41 to which is secured a mesh storage pocket 43 and a pull tab 45. Holder 31 also includes a bottom 47, a back 49, a top 51 and a plurality of envelopes 53 for holding individual CDs. Bottom 47 includes a Velcro strip 55 which mates with Velcro strip 57 on unit 33 (see FIG. 4). Top 51 includes a second Velcro strip 59 which mates with a Velcro strip (not shown) secured to the inside of the top of compartment 13.

Figure 6:
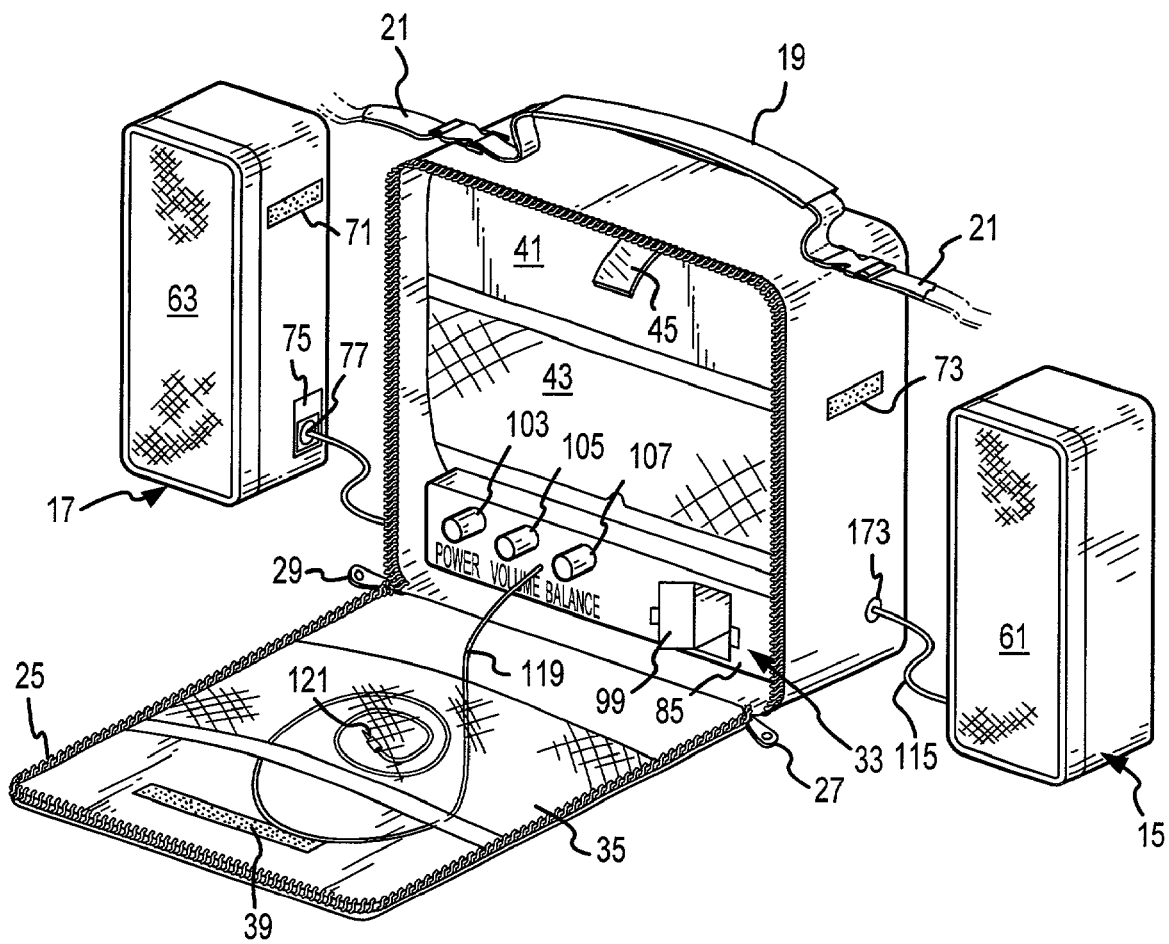
FIG. 6 is a perspective view of the bag of the present invention with the speaker compartments detached.
Figure 7:
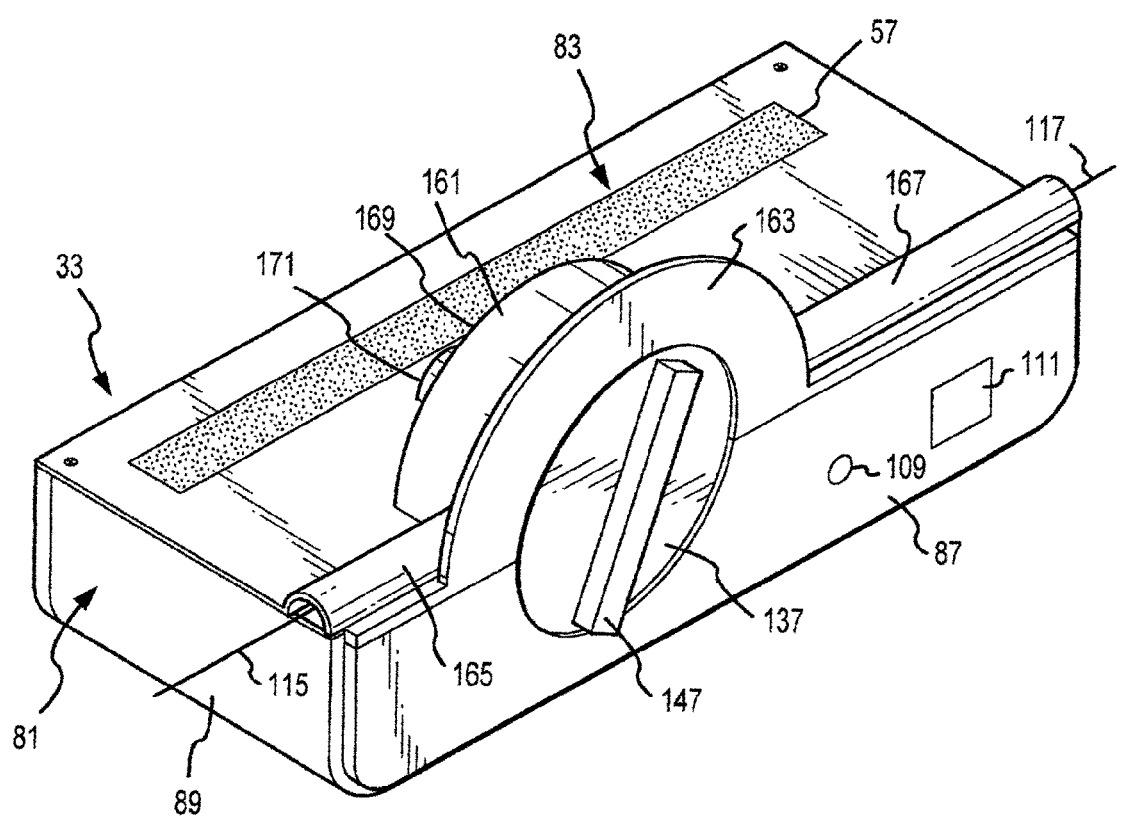
FIG. 7 is a back perspective plain view of the amplifier/power supply/wire rewind reel unit incorporated in the bag of the present invention.

Speaker compartments 15 and 17 are virtually identical. In the preferred embodiment each includes a molded plastic liner (not shown) having four sides and a front. Each front includes a cut-out (not shown) and support for a speaker (also not shown). Each speaker compartment also includes an opening in the side facing compartment 13 to permit the passage of a speaker wire. Preferably, the front of each compartments 15 and 17 is covered with a layer of foam (not shown) which is, in turn, covered with fabric as illustrated at 61 and 63. The sides of compartments 15 and 17 are also covered with a thin layer of foam (not shown) and then a layer of fabric (such as the same fabric covering used for the exterior of compartment 13). As illustrated in FIG. 5, the respective backs are closed by covers 65 and 67. As speaker compartments 15 and 17 are designed to be detachably secured to compartment 13, so the speakers can be separated from each other and compartment 13, the facing sides of the compartments are provided with mating Velcro strips, portions of which are illustrated at 71 and 73 in FIG. 6. As also illustrated in FIG. 6, the side of compartment 17 has a plate 75 having an aperture 77 therein through which speaker wire passes. Compartment 15 has an identical plate (not shown).

As those skilled in the art will appreciate, instead of one pair of Velcro strips, each compartment can be secured with two Velcro strips. Alternately, the mechanism for securing speaker compartments 15 and 17 to compartment 13 can include zippers (not shown), a hook and eye mechanism (not shown) or snaps (also not shown). Compartment 13 could also have pockets on either side (not shown) into which speaker compartments 15 and 17 could be dropped in. Finally, as noted above, strap 21, either by itself or in conjunction with the foregoing, can be used to secure compartments 15 and 17 to compartment 13.

Figure 8:
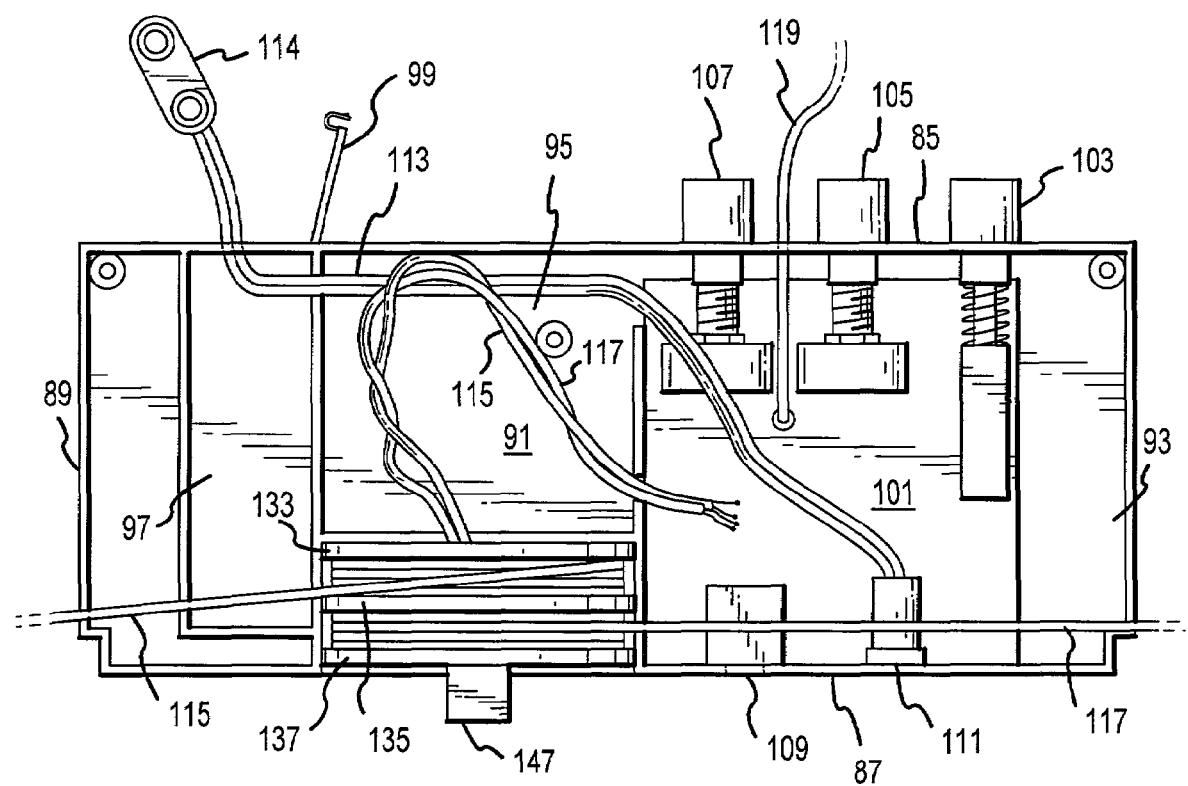
FIG. 8 is a top plain view of the amplifier/power supply/wire rewind unit of FIG. 7.

A personal audio device such as a CD player 37 does not have enough audio output to satisfactorily drive the speakers mounted in compartments 15 and 17. This drawback is overcome by amplifier/power supply/speaker wire take-up reel unit 33, which is best illustrated in FIGS. 6–10. Unit 33 includes a housing 81 having a cover 83, front panel 85, back panel 87, sides (one of which is illustrated at 89) and bottom 91. The interior of housing 81, as illustrated in FIG. 8, includes an electronics compartment 93, a wire and take-up reel section 95 and a battery compartment 97 having a door 99. Preferably, housing 81 is molded plastic. Supported within compartment 93 is a circuit board 101 on which are mounted electrical power switch 103, volume control 105, stereo speaker balance control 107, head phone jack 109 and receptacle 111 (which is adapted to receive the male connector (not shown) of a conventional (off-the-shelf) 120 volt-9 volt transformer. Also connected to board 101 is wire pair 113 (which terminates in a conventional 9 volt battery connector 114), speaker wires 115 and 117, and wire 119 (which terminates in male connector 121) which is adapted to be received in the audio output jack of portable CD player 37. The bottom of pocket 35 includes an opening (not shown) to permit the insertion of wire 119 and connector 121. Board 101 also includes a variety of other components (not shown) for (for instance) amplification, and connections (also not shown) between the components. All are conventional and, thus, not illustrated.

Figure 10:
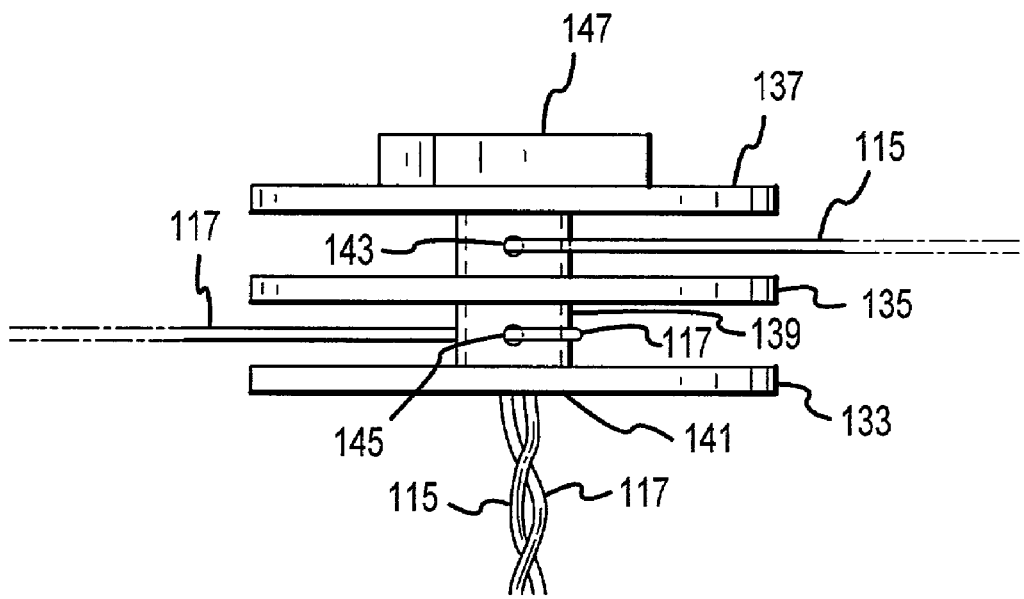
FIG. 10 is a top plain view of the take-up reel with the speaker wire uncoiled.

Take-up reel 131 is generally cylindrical in shape and includes interior disc 133, middle/wire dividing disc 135, and back disc 137. All are circular discs having the same radius. These discs are interconnected by hollow cylinder 139, which has a wire input opening 141 on the side of interior disc 133 and two wire outlets 143 and 145, as illustrated in FIG. 10. The outside surface of disc 137 supports turn knob 147.

The circular perimeters of discs 133, 135 and 137 are supported by semi-circular surface 151 which is, preferably, molded into housing 81. See, particularly, FIG. 9B. The radius of curvature of surface 151 is just slightly greater than the radius of curvature of discs 133, 135 and 137, to thereby permit the exposed edges of these three discs to rotate freely. Lateral movement is prohibited by lip 153 and end 155.

Cover 83 includes a cylindrical section 161, an arcuate section 163 and first and second wire channels 165 and 167. The interior of section 161 includes a cylindrical surface (not shown) which mates with surface 151 to form a cylinder. A portion of arcuate section 163 forms a flange which mates with flange 153. The back end 169 of cylindrical section 161 mates with end 155 to also prevent inward lateral movement of take-up reel 131. Finally, cover 83 includes a second hollow cylindrical section 171 so that opening 141 is not covered to otherwise block wires 115 and 117.

Figure 9A:
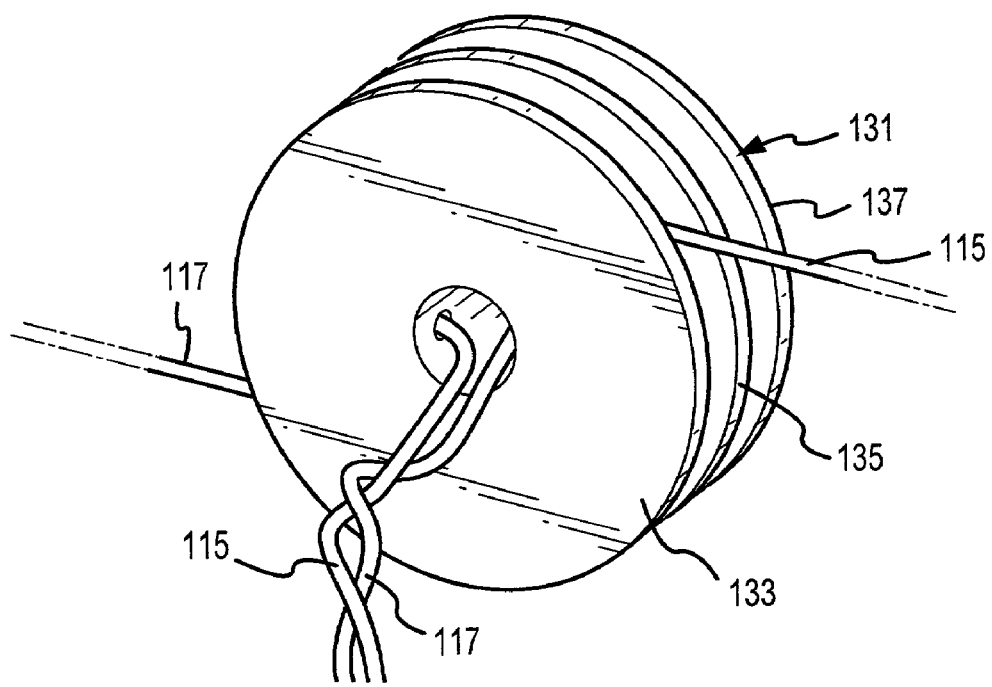
FIG. 9A is a perspective view of the take-up reel itself.
Figure 9B:
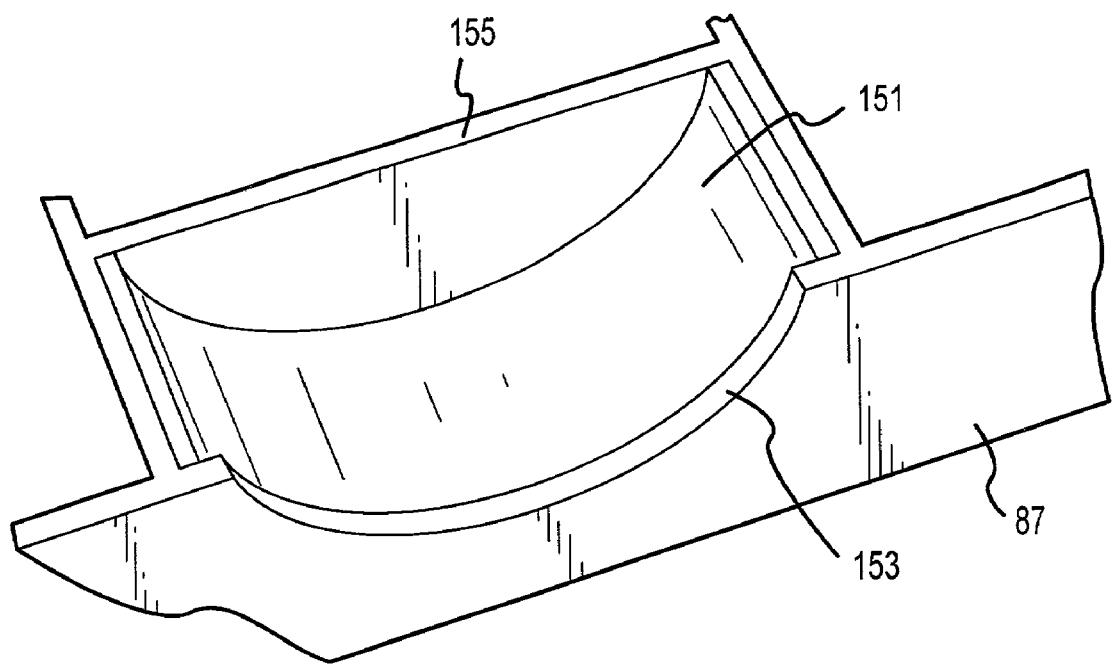
FIG. 9B is a partial perspective view of the housing of the amplifier/power supply/wire rewind.

In operation, wires 115 and 117 are twisted, as illustrated in FIGS. 8 and 9A, before being threaded through, respectively, holes 143 and 145. Both wires are then wrapped, in the same direction, with wire 115 being between discs 135 and 137 and wire 117 between discs 133 and 135. Enough wire is left uncoiled to connect to, respectively, the speakers in compartments 15 and 17 when they are adjacent to compartment 13. These wire portions pass through channels 165 and 167, openings in compartment 113, such as illustrated at 173, and openings in compartments 15 and 17, such as opening 77 in plate 75. See FIG. 6. When compartments 15 and 17 are detached from and moved away from compartment 13, take-up reel 131 rotates as the wires 115 and 117 are spooled off take-up reel 131. As take-reel 131 rotates those portions of wires 115 and 117 which are twisted together in section 93 of housing 81 are partially untwisted. When it is desired to reattach compartments 15 and 17 to compartment 13, knob 147 is rotated in the opposite direction to take-up wire 115 and 117. This action also re-twists those portions which are in section 93.

To use the carrier of the present invention connector 121 is plugged into, for instance, CD player 37, and the power is turned on. Balance and volume are adjusted as desired by the user. The speaker compartments 15 and 17 are typically uncoupled from compartment 13 and spaced apart as desired. In the process wires 115 and 117 are spooled off take-up reel 131 as discussed above.

As those skilled in the art will appreciate, there are numerous possible variations. The alternate manners of attaching compartments 15 and 17 to compartment 13 are discussed above. Other variations are possible. Instead of using a 9-volt battery, a conventional 120 volt to 9 volt transformer (or for automotive use a 12 volt to 9 volt transformer) can be used (via receptacle 111) illustrated in FIG. 7. If compartments 15 and 17 are attached to compartment 13 via pockets attached thereto, take-up reel 131 could be eliminated by storing the speaker wire in such pockets. Instead of take-up reel 131, wires 115 and 117 could be wound (by hand) on ears or brackets. Alternately, speaker wires 115 and 117 and take-up reel 131 could be eliminated and replaced with a transmitter, in which case each speaker assembly would include a receiver. Another variation would be the inclusion of a woofer in compartment 13.

I claim:

1. A portable carrier for personal audio device wherein said personal audio device normally is listened to with headphones, said carrier comprising:
   a. a first compartment adapted to contain said personal audio device;
   b. a second compartment adapted to contain speaker means, said second compartment being detachably connected to said first compartment to permit said second compartment to be disposed remotely from said first compartment;
   c. wire means for transmitting an electrical signal from said personal audio device to said speaker means; and
   d. wire take-up means, disposed within one of said first and second compartments, upon which said wire may be wrapped.

2. The portable carrier of claim 1, wherein said wire take-up means includes a spool on which said wire means is, at least, partially wrapped, and means for rotatably supporting said spool.

3. The portable carrier of claim 2, wherein said spool includes a hollow portion through which said wire means passes prior to being partially wrapped.

4. The portable carrier of claim 3, further including a third compartment adapted to contain a second speaker means, wherein said wire means includes first and second wires, wherein said first and second wires include first portions and second portions, said first portions being twisted together, said second portions being wrapped on said spool.

* * * * *